(12) United States Patent
Ishitaka

(10) Patent No.: US 6,808,282 B2
(45) Date of Patent: Oct. 26, 2004

(54) LIGHT GUIDE PLATE HAVING ANTI-REFLECTION LAYER AND A METHOD OF MANUFACTURING THE SAME

(75) Inventor: Yoshihiko Ishitaka, Fukushima-ken (JP)

(73) Assignee: Alps Electric Co., Ltd., Tokyo (JP)

(*) Notice: Subject to any disclaimer, the term of this patent is extended or adjusted under 35 U.S.C. 154(b) by 0 days.

(21) Appl. No.: 10/323,057

(22) Filed: Dec. 18, 2002

(65) Prior Publication Data

US 2003/0123244 A1 Jul. 3, 2003

(30) Foreign Application Priority Data

Dec. 28, 2001 (JP) .................................... 2001-400596

(51) Int. Cl.⁷ .............................................. F21V 7/04
(52) U.S. Cl. .................. 362/31; 362/561; 362/558; 362/26; 349/62; 349/65; 349/64
(58) Field of Search ............................ 362/31, 26, 561, 362/558; 349/62, 65, 64

(56) References Cited

U.S. PATENT DOCUMENTS 6,565,224 B1 * 5/2003 Umemoto et al. ............ 362/31

FOREIGN PATENT DOCUMENTS

JP          03-70201        11/1991

* cited by examiner

Primary Examiner—Stephen Husar
Assistant Examiner—Bertrand Zeade
(74) Attorney, Agent, or Firm—Brinks Hofer Gilson & Lione

(57) ABSTRACT

A light guide plate includes a light guide positioned to receive light from a light source at a side end face. The light guide includes an exit surface that conveys light from the guide plate. Preferably, the exit surface has an anti-reflection layer having microscopic recesses or projections arranged in a lattice.

9 Claims, 11 Drawing Sheets

LIGHT GUIDE PLATE HAVING ANTI-REFLECTION LAYER AND A METHOD OF MANUFACTURING THE SAME

BACKGROUND

1. Field of the Invention

The present invention relates to an illumination device, and more particularly, to an illumination device disposed near a side of a liquid crystal panel.

2. Related Art

Illumination devices also known as front lights are positioned on a front side of a reflection type liquid crystal display. The front lights are positioned above a viewer's side of a liquid crystal panel to illuminate a liquid crystal panel.

FIG. 12 is a sectional view of a liquid crystal display 100 having a front light 110 positioned on a front side of a liquid crystal panel 120. In the illustrated liquid crystal panel 120, a liquid crystal layer 123 secured by a sealant 124 is positioned between a top substrate 121 and a bottom substrate 122. A liquid crystal control layer 126 is positioned on an inner surface of the top substrate 121. A reflection layer 127 having a high reflectance is positioned below a liquid crystal control layer 128.

As shown, the front light 110 includes a flat light guide plate 112 and a light source 113 positioned directly adjacent to a side end face 112a. A portion of the light emitted from the light source 113 is received by the light guide plate 112 at the side end face 112a. The light is reflected by a reflecting surface 112c that includes a prism that changes the propagating direction of the light.

An anti-reflection layer 117 is positioned directly adjacent to an exit surface 112b, which allows light to be directed toward the liquid crystal layer 123. The anti-reflection layer 117 prevents reflected light within the reflection type liquid crystal panel 120 from being further reflected within the light guide plate 112.

In some devices a plurality of layers having different refractive indices such as layers made of SiO2 and TiO2 form the anti-reflection layer 117. This anti-reflection type layer is formed by a sputtering and vacuum deposition method. The method can provide a 1/4λ optical condition, which allows light to be transmitted with a high transmittance ratio.

The above-described method for forming the anti-reflection layer 117 can have many problems. One problem is that the vacuum deposition and sputtering methods have a low yield and a high manufacturing cost. The high cost arises, in part, because these methods are processed in batch. Since the anti-reflection effect is provided by a combination of reflective indices and layer thicknesses, it can be difficult to achieve an anti-reflection effect for all visible wavelengths. Moreover, when an illumination device having such an anti-reflection layer is observed from a diagonal position, the anti-reflection layer 117 can appear with a colored tint that diminishes the quality of a displayed image.

Durability can also become problem since the above-described anti-reflection layer 117 is made of multiple layers. Multiple layers are especially susceptible to environments having a high temperature and a high humidity. Such conditions can affect the reliability of the light guide plate 112 and the front light 110.

To improve productivity, a method of making an anti-reflection layer has been proposed that uses an organic compound having a relatively low refractive index. In this concept, an immersion process uses a material whose refractive index can be arbitrarily changed and from which a practical processing liquid can be produced. Unfortunately, it is difficult to form an anti-reflection layer that can provide a high anti-reflection effect because there are few materials that can adequately control the refractive index and are easy to produce. Further, to achieve a practical anti-reflection effect, the application of the organic compound to the light guide plate must be followed by post-processes such as a heating process, which deteriorates the characteristics of the light guide plate.

SUMMARY

A light guide plate comprises a structure that receives light at a side end face, facilitates light propagating therein, and conveys light through an exit surface. Preferably, an anti-reflection layer is coupled to the exit surface. In one embodiment, the anti-reflection layer comprises microscopic recesses and/or projections. Theses recesses and/or projections can be a submicron in lenght and/or arranged like a lattice on the exit surface.

In a light guide plate embodiment, microscopic concave and/or convex features about equal to or smaller than the wavelength of visible light are arranged or formed on the exit surface of a light guide plate. Preferably, the concave and/or convex features prevent light incident to an exit surface from being reflected, thereby improving the transmittance ratio at the exit surface. The light guide plate allows light propagating in the light guide plate to pass through the exit surface at a high efficiency. When combined with a light source, this embodiment encompasses a high intensity illumination display.

In a second light guide plate embodiment, the anti-reflection layer comprises microscopic recesses and/or projections preferably having a pitch of about 0.3 $\mu$m or less. Preferably, this configuration allows shorter wavelength light to be sufficiently transmitted, thereby providing an anti-reflection effect. When the pitch exceeds 0.3 $\mu$m in this embodiment, a portion of the light traveling though the light guide plate is reflected, which reduces the transmittance ratio at the exit surface. While the effect of preventing reflection of light in this embodiment becomes more significant the smaller the pitch, the pitch is preferably about 0.2 $\mu$m.

In a third light guide plate embodiment, the microscopic recesses and/or projections are arranged in a staggered lattice. Such a configuration allows a higher density of recesses and/or projections than that of the tetragonal lattice arrangement and embodiment. Preferably, the microscopic recesses can be arranged with a small effective pitch, which improves the anti-reflection effect and prevents light transmitted or reflected by the anti-reflection layer from being tinted.

In a fourth embodiment, the recesses and/or projections formed in a staggered arrangement are preferably arranged in a direction in which the effective pitch of the recesses or projections is minimized in a main light guide direction. Such a configuration provides an improved anti-reflection effect.

"An effective pitch" is equivalent to the distance between a first straight line that passes through the center of a certain projection (recess) and a second straight line that passes through the center of a projection (recess) adjacent to the projection (recess) and is parallel to the first straight line. The effective pitch of the plurality of projections arranged like a tetragonal lattice in an arranging direction of the projections is the same as the pitch of those projections. The effective pitch in the diagonal direction of the tetragonal lattice is ½ of the pitch of the projections and is slightly smaller than the actual pitch. Further, when the projections of the anti-reflection layer are arranged in a highest density in a staggered arrangement like a hexagonal lattice, the effective pitch is as small as about ½ of the actual pitch.

The "main light guide direction in the plane of the light guide plate" is a macroscopic propagating direction of light introduced into the light guide plate from the light source positioned near a side end face of the light guide plate. The main light guide direction is normally a direction from the side end face where the light source is positioned toward a second side end face that is across from it.

In one light guide plate embodiment, the effective pitch of the recesses and/or projections in the main light guide direction in the plane of the light guide plate is preferably about 0.15 µm or less. Such a configuration provides a light guide plate that achieves an improved anti-reflection effect and which prevents light transmitted or reflected thereby from being tinted.

A method of manufacturing a light guide plate includes coupling a light source to a side end face having an exit surface. Preferably, the method utilizes an injection molding die that has a submicron lattice microscopic recesses and/or projections on a cavity wall associated with a light guide plate exit surface. Preferably, the shape of the microscopic recesses and/or projections within the light guide plate are formed by the injection molding.

Preferably, the manufacturing method forms the anti-reflection layer on the exit surface and the light guide plate together. In this aspect, there is no need for performing the separate acts of forming or applying an anti-reflection layer. The elimination of these acts improves the efficiency of the manufacturing process.

In one method of making a light guide plate, a die is used having microscopic recesses and/or projections in the form of a staggered lattice arranged and formed with a pitch of about 0.3 µm or less. Preferably, the lattice is formed within a wall cavity of the die that forms the light guide plate exit surface.

An illumination device embodiment includes any of the above-described light guide plates and a light source positioned near a side face of the light guide plate. Preferably, light introduced into the light guide plate from the light source exits from the exit surface of the light guide plate.

Preferably, the illumination device embodiment prevents attenuation of light reflected by the liquid crystal panel caused by a reflection at a bottom surface of the liquid guide plate, which increases the panels intensity. When coupled to a color display, true color reproducibility is achieved because light transmitted by the light guide plate is not distorted by a tint.

BRIEF DESCRIPTION OF THE DRAWINGS

FIG. 4A shows an example of a tetragonal lattice, FIG. 4B shows an example of a staggered lattice;

DETAILED DESCRIPTION OF THE PRESENT EMBODIMENTS

Figure 1:
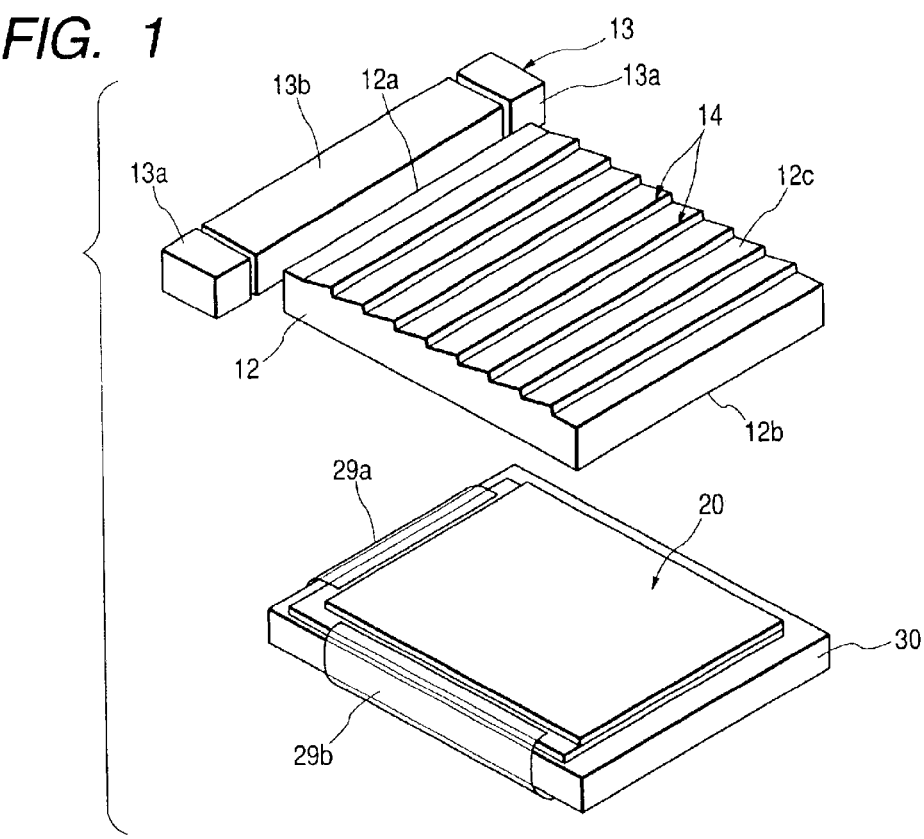
FIG. 1 is a perspective view of a liquid crystal display embodiment.
Figure 2:
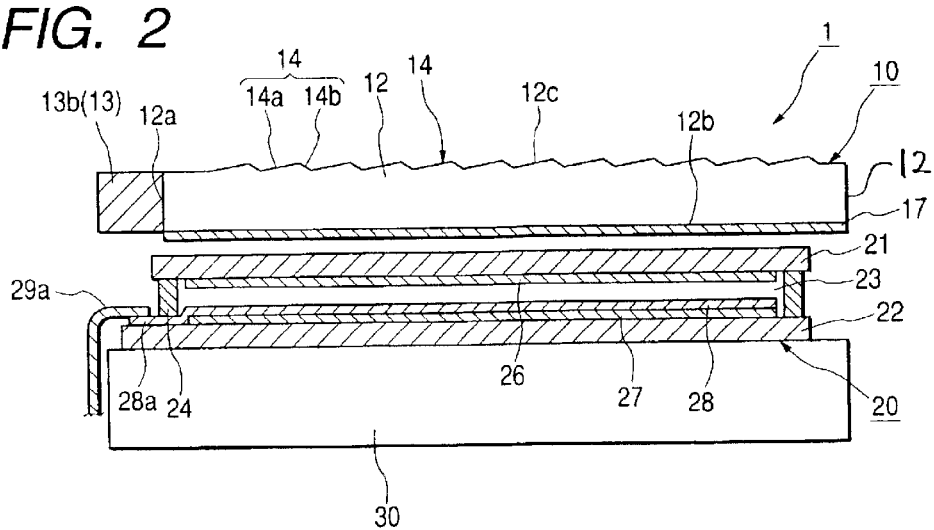
FIG. 2 is a sectional view of the liquid crystal display embodiment shown in FIG. 1.

FIG. 1 is a perspective view of a liquid crystal display embodiment, and FIG. 2 is a sectional view of the liquid crystal display shown in FIG. 1. The liquid crystal display shown in FIGS. 1 and 2 is comprised of a reflection type liquid crystal panel 20 and a front light (illumination device or light source) 10 disposed near a front side.

The front light 10 is comprised of a transparent light guide plate 12 having a substantially flat plate like shape positioned adjacent to a light source 13. Preferably, the light source 13 is positioned near a side end face (light entering or receiving surface) 12a of the light guide plate 12. In this embodiment, the light guide plate 12 is made of an acrylic resin or polycarbonate-type resin, although other materials can also be used. The bottom side of the light guide plate 12 shown in FIG. 2 comprises an exit surface 12b where illumination from the front light 10 exits.

Preferably, a prism-like feature having a sectional view like a triangular wave are positioned on a top side of the light guide plate 12 (the side opposite to the liquid crystal display unit 20). More specifically, the top side of the light guide plate 12 includes a plurality of parallel projections 14. Preferably, the projections have an ascending or inclined gentle slope section 14a that diverge from a substantially horizontal plane that is preferably parallel with a second plane that encompass the exit surface 12(b) and a descending steep slope section 14b that diverge from the substantially horizontal plane. Preferably, the steep slope section 14(b) has a larger slope than that of the gentle slope section 14a. As shown, the sloped section forms a triangular like cross-section. Preferably, an anti-reflection layer 17 is formed on the exit surface 12b of the light guide plate 12.

The light source 13 positioned near or adjacent the side end face 12a of the light guide plate 12 is illustrated as a rod-shaped light positioned along the side end face 12a of the light guide plate 12. In this embodiment, the light emitting elements 13a are comprised of white LEDs positioned on both ends of a rectangularly-shaped or rod-shaped light guide body 13b. Light emitted by the light-emitting elements 13a is received by the light guide plate 12 through the light guide body 13b. By providing a guide body 13b with a surface that shares a substantially common width with the side end face 12a between the light-emitting elements 13a, the light guide plate 12 can be evenly illuminated.

Any light source 13 can be used in this embodiment that can radiate light into the side end face 12a of the light guide plate 12. For example, light-emitting elements arranged along a portion or the entire side end face 12a of the light guide plate 12 can be used eliminating the need for a light guide body 13b. Alternatively, only one light-emitting element 13a may be used in an embodiment.

The front light 10 preferably receives light from the light source 13 through the side end face 12a. Preferably, the light guide plate 12 changes the propagating direction of the light by reflecting the light by the steep slope sections 14b of the projections 14. Preferably, the steep slope sections 14 are positioned on a reflecting surface 12c that causes the light to exit from the exit surface 12b.

A feature of one light guide plate 12 embodiment is the anti-reflection layer 17 that is formed on the exit surface 12b. Preferably, the anti-reflection layer includes microscopic recesses and/or projections arranged like a lattice. In some embodiments, the microscopic recesses and/or projections are about a micron or submicron in length.

Figure 3:
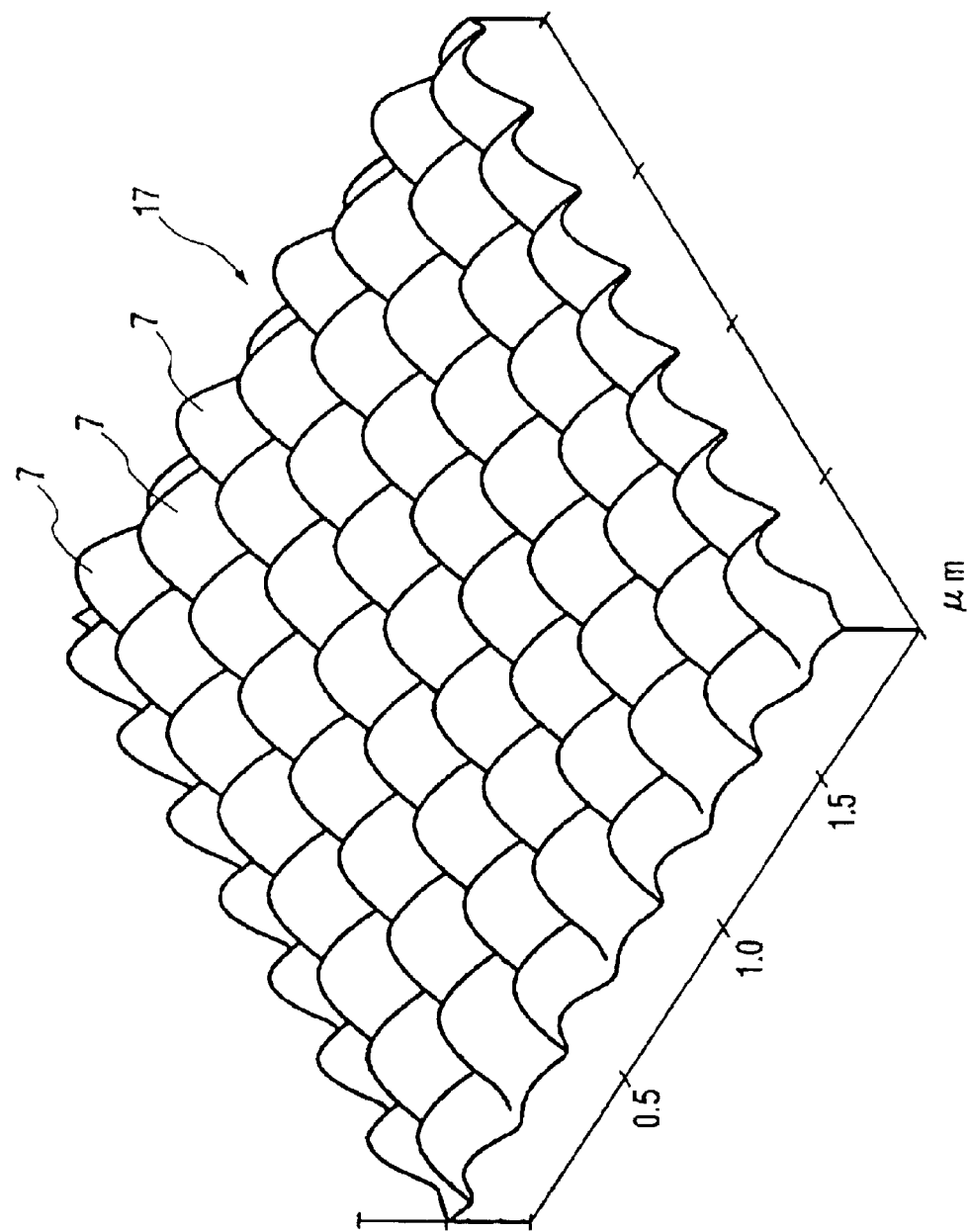
FIG. 3 is a partial perspective view of an anti-reflection layer shown in FIG. 2.
Figure 4A:
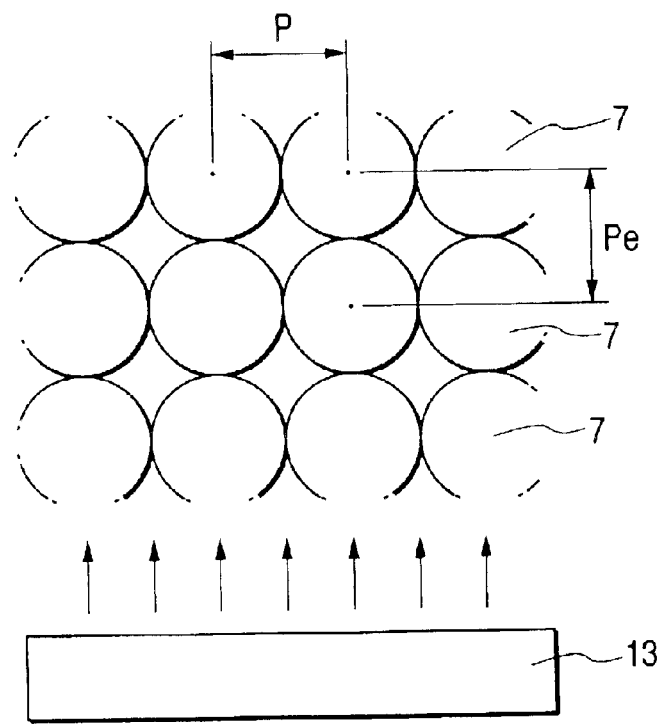
FIGS. 4A and 4B show examples of the projections of the anti-reflection layer shown in FIG. 3.
Figure 4B:
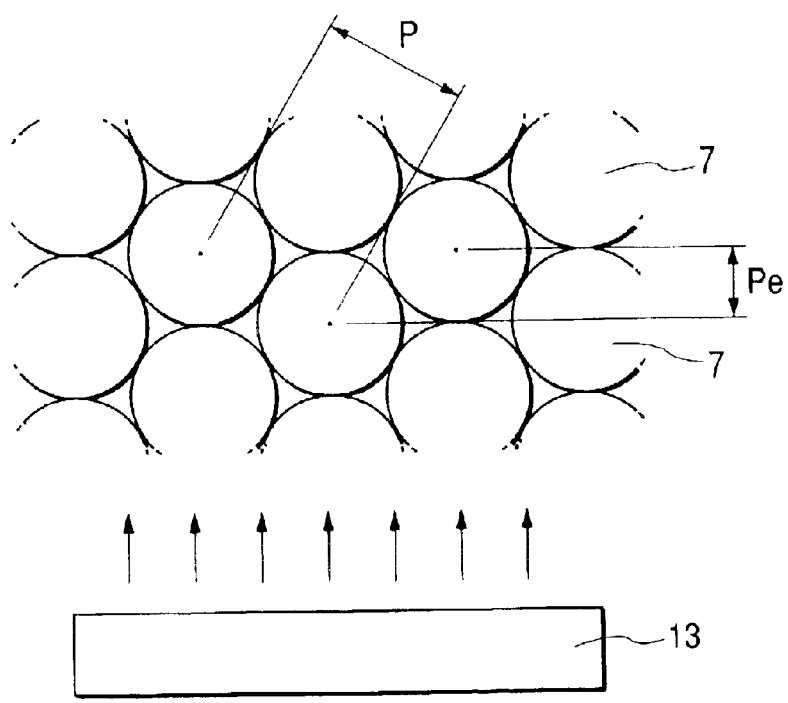

FIG. 3 is a partial perspective view of the anti-reflection layer 17 illustrating surface features. FIGS. 4A and 4B are plan views of the microscopic projections (and recesses) arrangement that comprise the anti-reflection layer 17. FIG. 4A shows the projections and/or recesses arranged in a tetragonal lattice embodiment. FIG. 4B shows the projection and/or recesses arranged in a staggered lattice embodiment.

As shown in FIG. 3, a multiple microscopic projections 7 having diameters in the range from about 0.15 to about 0.4 $\mu$m are formed in a staggered lattice arrangement on a surface of the anti-reflection layer 17. Preferably, the staggered lattice arrangement allows light that has a wide ranging wavelength to be transmitted with a high transmittance ratio. Reflection of light can preferably be minimized or prevented by providing such microscopic concave and/or convex features. Preferably, each of the projections is arranged and formed with a height and a repetitive pitch about equal to or less than the wavelength of a visible spectrum to prevent incident light from being reflected, as disclosed in an article of Faunhofer Gesellshaft in Germany.

Preferably, the anti-reflection layer 17 minimizes light reflection when light impinges upon the exit surface 12b after propagating in the light guide plate 12. Since there is preferably little reflection inside the exit surface 12b, a whitening effect is also suppressed which otherwise occurs when light reflected by the exit surface 12b reaches a user. The suppression of the whitening effect improves display quality of an image or text by improving contrast.

The anti-reflection layer 17 also minimizes the light reflected by the reflection type liquid crystal panel 20 that strikes the exit surface 12b. When a light wave that was reflected by the liquid crystal panel 20 strikes the exit surface 12b, it is reflected back as two reflected waves that partially or totally cancel. In the light guide plate 12 embodiment, the reflection is eliminated by the anti-reflection layer 17.

According to one embodiment, the pitch of the projections 7 is preferably about 0.3 $\mu$m or less, and the height of the projections 7 is preferably about 0.2 $\mu$m or more. One reason for this preference is that light can be tinted when it enters the light guide plate 12 if the pitch exceeds 0.3 $\mu$m. Another reason for this preference is that the anti-reflection effect becomes less effective in reducing reflection when the height of the projections 7 is less than 0.2 $\mu$m.

While the transmittance of the anti-reflection layer 17 can be higher using projections 7 that have a smaller pitch, it can be difficult to arrange and form projections 7 that are as small as 0.2 $\mu$m having uniform dimensions. Very small projections 7 can increase the manufacturing cost, and therefore, a practical lower limit of the pitch of the projections 7 in this embodiment is about 0.2 $\mu$m.

While the projections 7 of the anti-reflection layer 17 according to the embodiment may be arranged in a tetragonal lattice as shown in FIG. 4A or a staggered lattice as shown in FIG. 4B, the staggered lattice configuration shown in FIG. 4B is preferred. The anti-reflection layer 17 is preferably formed such that the portion of the projection 14 that has a minimum pitch 14a has a positive slope and the portion that has a greater pitch 14b has a negative slope. In one embodiment, this means that the direction in which the projection 14 has a minimum pitch is about parallel to and ascends in a direction in which light radiates into the light guide plate 12.

A main light guide direction in a plane of the light guide plate 12 is preferably a direction from which light travels from the side end face 12a of the light guide plate 12 toward a side opposite and across from the side end face 12a.

In FIG. 4A, an effective pitch Pe of the projections 7 is equal to a pitch P of the projections 7 that are adjacent to each other in a vertical direction and, in the vertical direction of FIG. 4B, the effective pitch Pe is the vertical distance between the centers of projections 7 that are adjacent to each other in a diagonal direction and is equal to about ½ of the actual pitch P.

Thus, the effective pitch Pe of the projections 7 can be smaller in a staggered lattice arrangement of FIG. 4B than in a tetragonal lattice arrangement of FIG. 4A. The possibility of light reflection at the anti-reflection later 17 can be further reduced by making the direction in which the effective pitch Pe is minimized parallel with the main light guide direction of the light guide plate 12. This embodiment improves color reproducibility of the liquid crystal display by reducing the tinting of light transmitted or reflected by the anti-reflection layer 17.

Therefore, even in the tetragonal lattice embodiment of the projections 7 shown in FIG. 4A, the effective pitch Pe can be made smaller by arranging the projections 7 diagonally. The projections 7 can be arranged such that the angle formed by the lines of pitch and the light path form about a 45 degree angle. As shown in FIG. 4A, light travels from a vertical direction. Even in a staggered lattice embodiment not shown, the effective pitch Pe in the vertical direction about equals the pitch P of the projections 7 when the projections 7 are arranged in a horizontal direction (such that a straight line connecting the centers of projections 7 adjacent to each other is directed in the horizontal direction of the figure).

In one light guide plate 12 embodiment, the effective pitch of the projections 7 in a main light guide direction of the light guide plate 12 is preferably about 0.15 $\mu$m or less. When the effective pitch exceeds 0.15 $\mu$m in this embodiment, the improvement in the anti-reflection property of the anti-reflection layer 17 is reduced.

In the light guide plate 12 embodiment, an anti-reflection layer 17 may also be formed on the side end face 12a adjacent to the light source 13. In this configuration, the utilization of a second anti-reflection layer can further improve the intensity of the front light 10. In alternative embodiments, a single anti-reflection layer may be positioned near or at the side of the end face 12a or at the exit surface 12b.

In one liquid crystal panel 20 embodiment, a liquid crystal layer 23 is sandwiched between a top substrate 21 and a bottom substrate 22 that are in a face-to-face relationship. Preferably, the liquid crystal layer 23 is secured by a sealing material 24 comprising a frame along inner circumferential edges of the substrates 21 and 22. In the liquid crystal display 1 shown in FIG. 2, the liquid crystal panel 20 is supported by a mold 30 positioned below the bottom substrate 22 and is connected to a control circuit (not shown) provided near a bottom surface of the mold 30.

As shown, the mold 30 is positioned below the liquid crystal panel 20 and partially enclosed by flexible substrates 29a and 29b that are laid around an outer periphery of the mold 30. A liquid crystal control layer 26 is positioned below the top substrate 21. Preferably, a reflection layer 27 having a metal thin film that reflects the visible spectrum from the front light 10 and external light is positioned above the bottom substrate 22. Preferably, the liquid crystal control layer 28 is positioned above the reflection layer 27.

The liquid crystal control layers 26 and 28 preferably comprise an electrode that controls the driving of the liquid crystal layer 23 and an alignment film. Preferably, the liquid crystal control layers 26 and 28 further include a semiconductor element for controlling the electrodes. A color filter that adds color to the display may be coupled to the liquid crystal to one or both of the control layers 26 and 28.

As shown in FIG. 2, the liquid crystal control layer 28 overlying the bottom substrate 22 is positioned such that it extends beyond the sealing material 24 and is connected to the flexible substrate 29a at an end 28a. The liquid crystal control layer 26 on the top substrate 21 is connected to the flexible substrate 29b shown in FIG. 1.

Preferably, the reflection layer 27 has a reflection film that is comprised of a metal thin film such as aluminum or silver, for example, that have a high reflectance ratio for reflecting external light incident to the liquid crystal panel 20 and visible light from the front light 10. Preferably, the reflection layer 27 has a light scattering section for preventing an increase in the intensity of reflected light in a particular direction that can reduce the visibility of the liquid crystal display. The light scattering section may comprise a reflection film having concave and/or convex features or a scattering film comprised of a resin film having resin beads dispersed therein having a refractive index different from that of the resin film.

Preferably, a liquid crystal display 1 embodiment is capable of sustaining a reflective or illuminated display utilizing an external light in an environment in which sufficient external light can be obtained. In an environment in which sufficient external light cannot be obtained, the liquid crystal display 1 embodiment preferably utilizes a light that exits from the exit surface 12b of the light guide plate 12 as a source of illumination. Since the anti-reflection layer 17 is positioned near the bottom light guide plate 12, preferably light introduced into the light guide plate 12 from the light source 13 can be transferred through the exit surface 12b efficiently.

Preferably, light that enters the liquid crystal panel 20 is reflected by the reflection layer 27 toward the light guide plate 12. In one embodiment, light received by the exit surface 12b is reflected back to the liquid crystal layer 23. In this liquid crystal display, the reflected light from the liquid crystal panel 20 reaches a user with substantially no reflection at the exit surface 12b of the light guide plate 12. Preferably this substantially prevents a reduction in the intensity of the displayed light caused by the reflection of light at the exit surface 12b and also prevents the whitening of the light guide plate 12 caused by that reflection.

The light guide plate 12 shown in FIG. 1 can be manufactured by many means including by an injection molding process. In one process, a cavity section of a die used to form the light guide plate 12 comprises microscopic recesses and/or projections formed in a wall that molds the exit surface 12b of the light guide plate 12. Injection molding transfers the concave and/or convex features of the cavity section to the exit surface 12b of the light guide plate 12, thereby forming the anti-reflection layer on the exit surface 12b. Preferably, the recesses and/or projections have micron or submicron lengths.

Referring to the concave and/or convex features formed in the wall of the die, preferably the pitch of the recesses and/or projections is about 0.3 $\mu$m or less. The recesses and/or projections are preferably arranged in a staggered lattice arrangement wherein the arranging direction of the pitch of the recesses and/or projections is preferably set, such that, an effective pitch of the recesses and/or projections is minimized in a direction perpendicular to the wall of the cavity associated with the side end face 12a. This embodiment makes it possible to manufacture a light guide plate 12 that has a high anti-reflection effect and which is less susceptible to tint.

The use of the above-described method makes it possible to manufacture a light guide plate 12 having an anti-reflection layer 17 quite efficiently without adding any additional acts. It is also possible to manufacture a light guide plate having an anti-reflection property that is equivalent to or greater than that formed using film forming methods.

The concave and/or convex features for forming the anti-reflection layer 17 on the die may be formed by patterning the wall of the die with an electron beam lithography apparatus and performing an etching process thereafter. The above-described method is not essential, and the anti-reflection layer 17 of the light guide plate 12 may be formed by coupling a stamper having concave and/or convex features to the cavity section of the die. The stamper for forming the anti-reflection layer 17 may be fabricated using known methods such as electromolding of Ni.

A light guide plate 12 having an anti-reflection layer 17 also on the side end face 12a can be fabricated by forming microscopic concave and/or convex features similar to those described above.

To create a light guide plate 12, a die is formed. Preferably, the die comprises a cavity section having recesses and/or projections. Preferably, a wall of the die associated with an exit surface 12b of the light guide plate 12 is patterned using an electron beam lithography and thereafter subjected to an etching process to form multiple recesses on the wall associated with the exit surface 12b of the light guide plate 12. The recesses formed on the die are preferably arranged in the form of a staggered lattice. The pitch between the recesses is preferably about 0.25 $\mu$m and the depth of the recesses is preferably about 0.25 $\mu$m.

In one injection molding process, an acrylic resin material is injected into the die to fabricate a light guide plate 12 of about 40 mm (w)×50 mm (l)×0.8 mm (t) having an anti-reflection layer 17 on the exit surface 12b. In this embodiment, the shape of a fabricated exit surface 12b was measured using Atomic Force Microscopy (AFM), which revealed that microscopic projections having heights in the range from about 0.23 to about 0.24 $\mu$m had been uniformly arranged and formed za staggered lattice having a pitch of about 0.25 $\mu$m.

Figure 5:
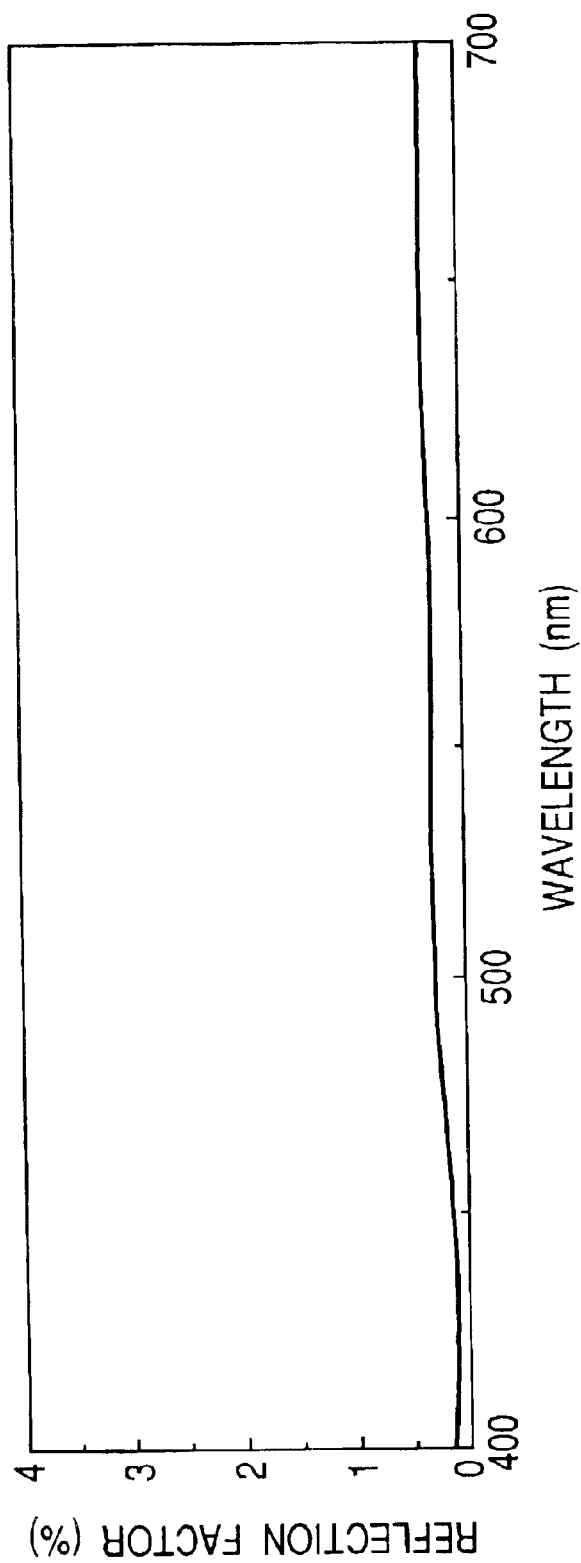
FIG. 5 is a graph of a reflectance of the light guide plate according to one embodiment.

In this embodiment, the reflectance of the exit surface 12b of the light guide plate 12 was also measured. FIG. 5 summarizes the results of those measurements. It was found that the reflectance was less than about 0.5% in a wavelength range of about 400 to 700 nm and that the exit surface 12b of the light guide plate 12 had an anti-reflection layer. A light guide plate was fabricated which had the same configuration as that of the guide plate 12 fabricated in the present embodiment except that no anti-reflection layer was formed on the exit surface, and the reflectance of the exit surface was measured, which resulted in a reflectance ranging from 4 to 5%.

To measure the difference in the anti-reflection effect attributable to the pitch of the projections that comprise the anti-reflection layer 17 of the light guide plate 12, three different types of light guide plates that differed by only the pitch of the projections were fabricated using a common fabrication method. Specifically, three types of dies in which the recesses formed in the cavity section had pitches of 0.25 $\mu$m, 0.3 $\mu$m, and 0.4 $\mu$m were prepared, and the three types of light guide plates were fabricated by an injection molding process using those dies.

The shapes of the exit surfaces of the resultant light guide plates were measured with an Atomic Force Microscopy (AFM), which revealed that the projections were formed with pitches of 0.25 $\mu$m, 0.3 $\mu$m, and 0.4 $\mu$m respectively and that the height of the projections were in the range from 0.25 to 0.27 $\mu$m in the light guide plates. A front light was then fabricated by positioning a rectangular light source having white LEDs on both ends of a light guide body on each side face of the light guide plates.

Figure 6:
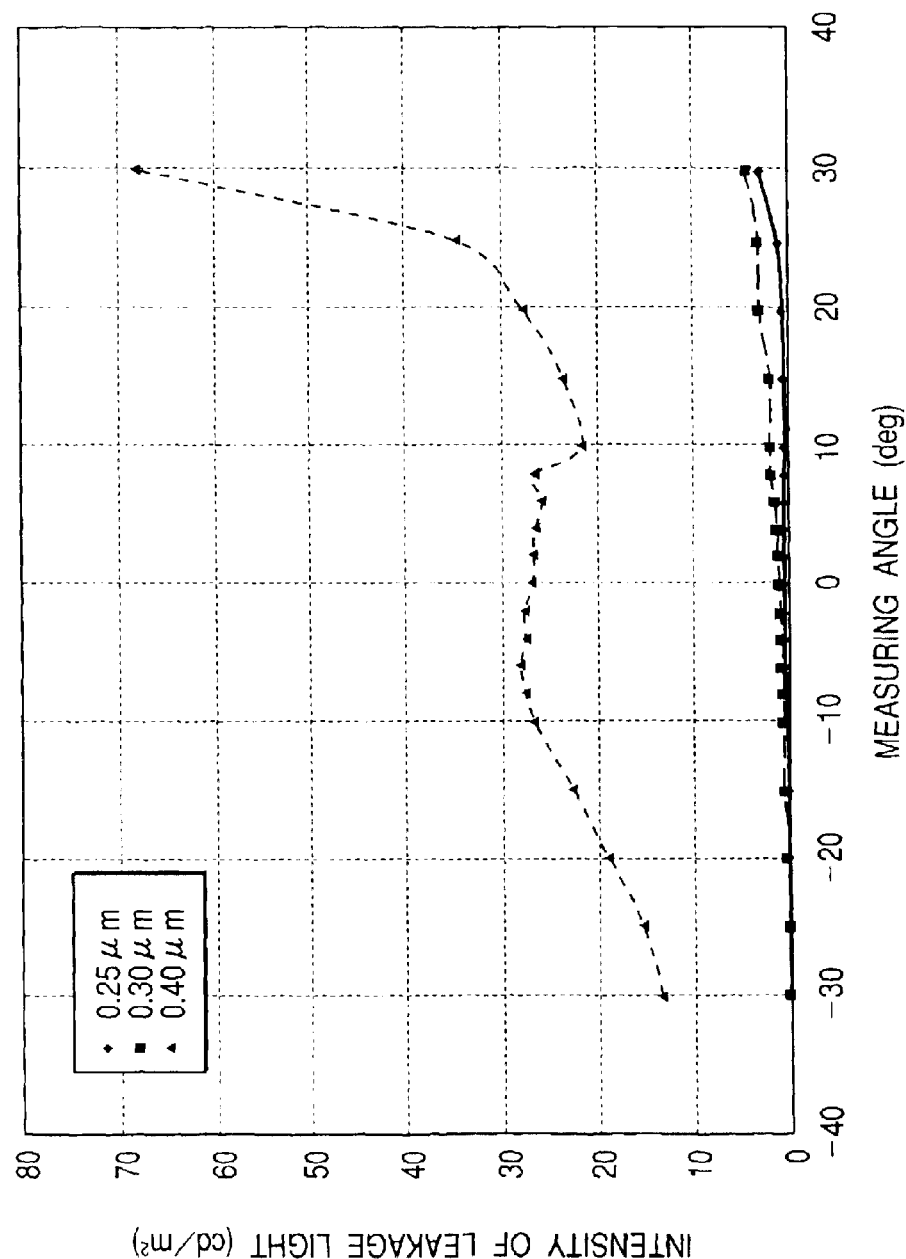
FIG. 6 is a graph showing an intensity of light leakage from a light guide plate according to a second embodiment.

Next, light leakage from the top surfaces of the light guide plates (surfaces opposite to the exit surfaces) was measured when the front lights were turned on. The light leakage was measured by moving a light detector in a range from −30 degrees to 30 degrees, wherein the normal direction of the light guide plates is 0 degrees. Inclinations occurring toward the side end face where the light source was positioned in the light guide direction in the plane of the light guide plate was designated the negative side and inclinations occurring in the opposite direction were designated the positive side. The result is shown in the graph of FIG. 6. The abscissa axis indicates the angles of the detector, and the ordinate axis indicates the intensity of light leakage.

As shown in FIG. 6, light leakage from the light guide plates with projection pitches of 0.25 $\mu$m and 0.3 $\mu$m were significantly smaller than light leakage from the light guide plate with a projection pitch of 0.4 $\mu$m. The light guide plates with projection pitches of 0.25 $\mu$m and 0.3 $\mu$m achieved an excellent anti-reflection effect. It was therefore found that the light guide plates with projection pitches of about 0.3 $\mu$m or less were capable of guiding light from the light source to the exit surface of the light guide plate efficiently. FIG. 6 further illustrates that high display quality can be achieved with a high contrast and intensity because there is only a small quantity of light leakage on the top surface of the light guide plate and hence little or no reduction in the visibility of display even when viewed from a front side of a liquid crystal panel.

Figure 7:
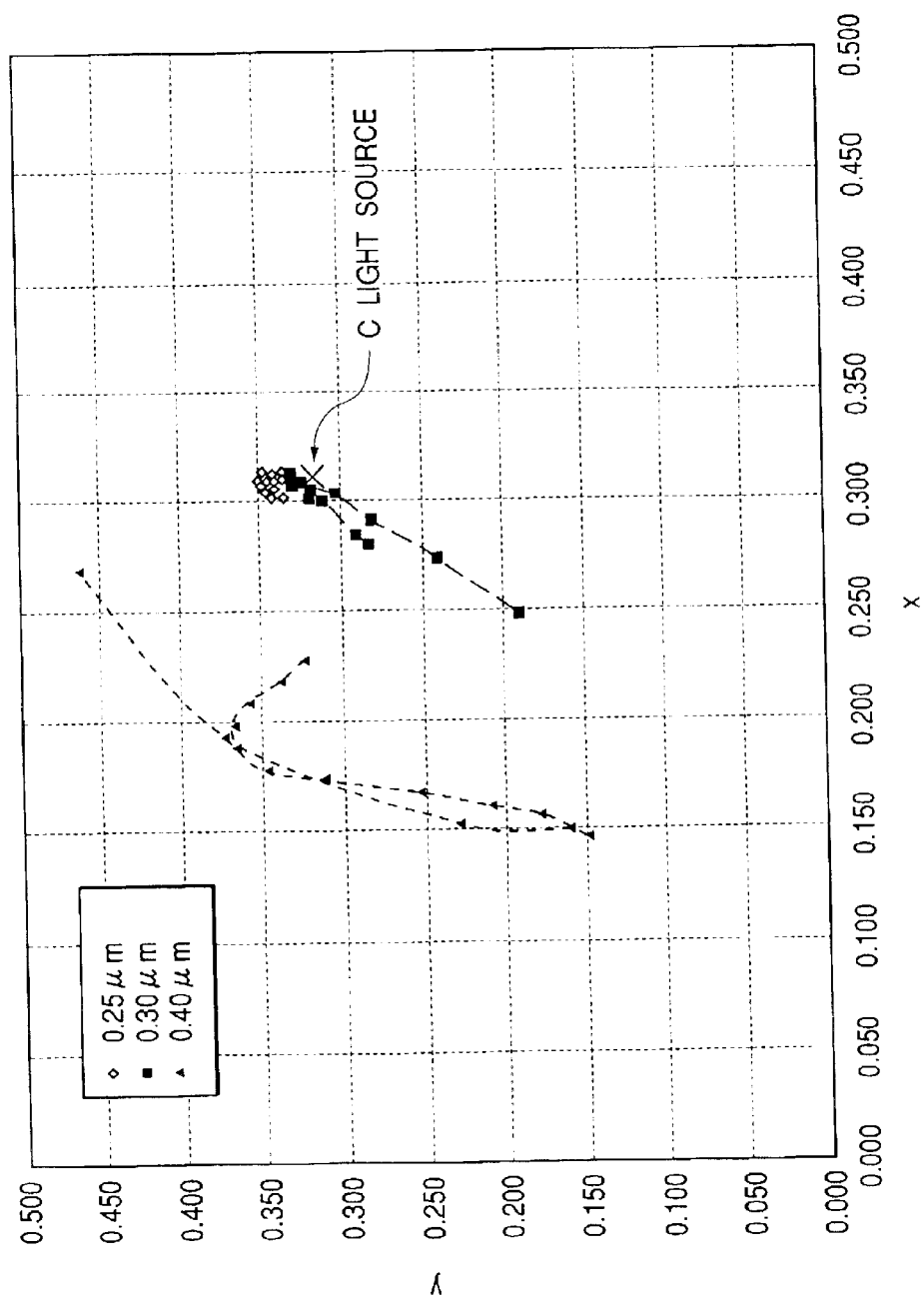
FIG. 7 is a graph showing a chromaticity of light leakage from the light guide plate according to the second embodiment.

Next, chromaticity of light leakage from each of the light guide plates were measured. The measurement was carried out by changing the angle of the light detector in a range from −30 degrees to 30 degrees in the light guide direction in the plane of the light guide plate. The result of the measurement is summarized in FIG. 7. FIG. 7 is an x-y chromaticity diagram, and the point indicated by the symbol x in the graph represents a C light source (white).

As shown in FIG. 7, the chromaticity of the light guide plates with projection pitches of about 0.25 $\mu$m and about 0.3 $\mu$m is less dependent on angles and is concentrated in the vicinity of the C light source. That is, when liquid crystal displays are comprised of front lights on a front side of liquid crystal panels, the liquid crystal panels exhibit high display color reproducibility with little or no tinting of the display even when observed from a diagonal direction. The light guide plate having a projection pitch of about 0.25 $\mu$m has a smaller distribution of chromaticity and is subjected to less tinting, and it therefore comprises a light guide plate having better color reproducibility. In contrast, in the light guide plate embodiment having a projection pitch of 0.4 $\mu$m, the chromaticity resides far away from that of the C light source and has a great distribution, and it is has lower color reproducibility than the light guide plates with smaller pitches. This lower quality may occur because light leakage is tinted with some color and the color varies with the angles.

To compare an arrangement of projections on an anti-reflection layer 17 of a light guide plate 12, two types of light guide plates were fabricated having different projections. First, a die in which recesses were arranged and formed like a tetragonal lattice a cavity wall section and a die in which recesses were arranged and formed like a staggered lattice were cast. In both of the dies, the recesses had a pitch of about 0.3 $\mu$m and a depth of about 0.3 $\mu$m. Then, a light guide plate was fabricated through an injection molding process using each of the dies. The shapes of the exit surfaces of the resultant light guide plates were measured using Atomic Force Microscopy (AFM), which revealed that the projections were arranged in the form of a tetragonal lattice and a staggered lattice, respectively. Moreover, both of the light guide plates had microscopic projections with a pitch of 0.3 $\mu$m and a height in a range from 0.27 to 0.29 $\mu$m.

Figure 8:
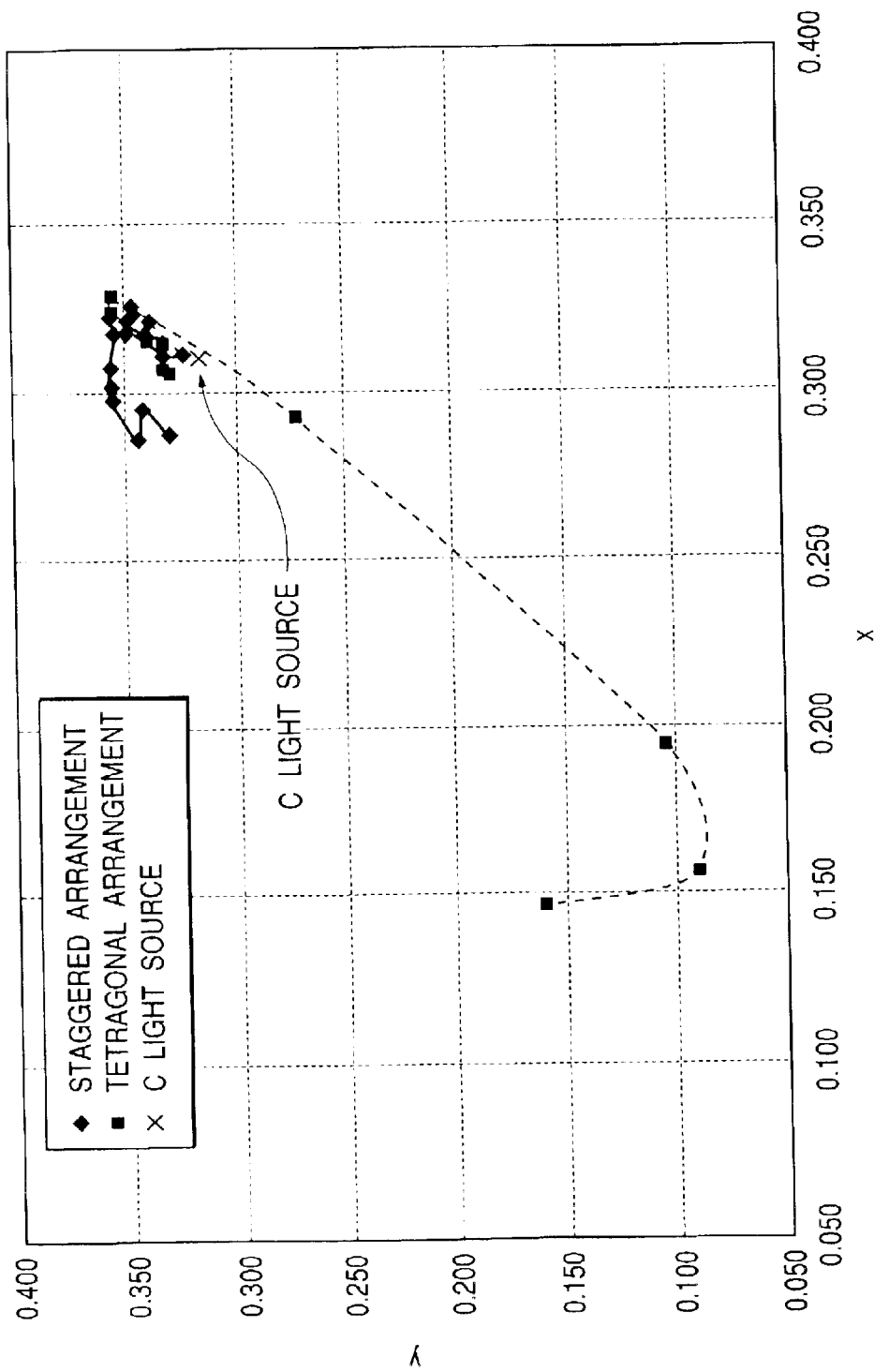
FIG. 8 is a graph showing a chromaticity of light leakage from a light guide plate according to a third embodiment.

A front light was also configured by positioning a rod-shaped light source on a side end face of each of the light guide plates. The chromaticity of light leakage was also measured in the same manner as previously described with front lights turned on. As summarized in FIG. 8, the chromaticity of the light guide plate with the projections arranged in staggered lattice arrangement is smaller in distribution than the light guide plate having projections arranged in a tetragonal lattice arrangement. The evaluation showed that the chromaticity of light guide having projections arranged in a tetragonal lattice had a tendency to move away from that of the C light source when viewed at a large angle. When viewed from this perspective a slight change occurs in a display color because the light guide plate is less tinted when viewed from a frontal position and is tinted slightly more when viewed from a diagonal position.

To evaluate how the anti-reflection characteristics of a light guide plate are affected by the relationship between the main light guide direction of the light guide plate and the direction in which projections of the anti-reflection layer are arranged, two types of light guide plates having projections arranged in different direction were fabricated using the same method as described above. The light guide plates had the same projection pitch of 0.25 $\mu$m and had substantially the same projection height in the range from 0.23 to 0.24 $\mu$m.

Referring to the arrangement of projections, one of the light guide plates comprised projections arranged in a direction in parallel with the main light guide direction of the light guide plate and the other light guide plate comprised projections arranged in a direction orthogonal to the main light guide direction of the light guide plate. The former light guide plate had an effective pitch of 0.125 $\mu$m in the main light guide direction, and the latter had an effective pitch of 0.217 $\mu$m. Specifically, referring to the arrangement of the former, the projections of the anti-reflection layer were arranged such that the effective pitch in the main light guide direction of the light guide plate was minimized.

Figure 9:
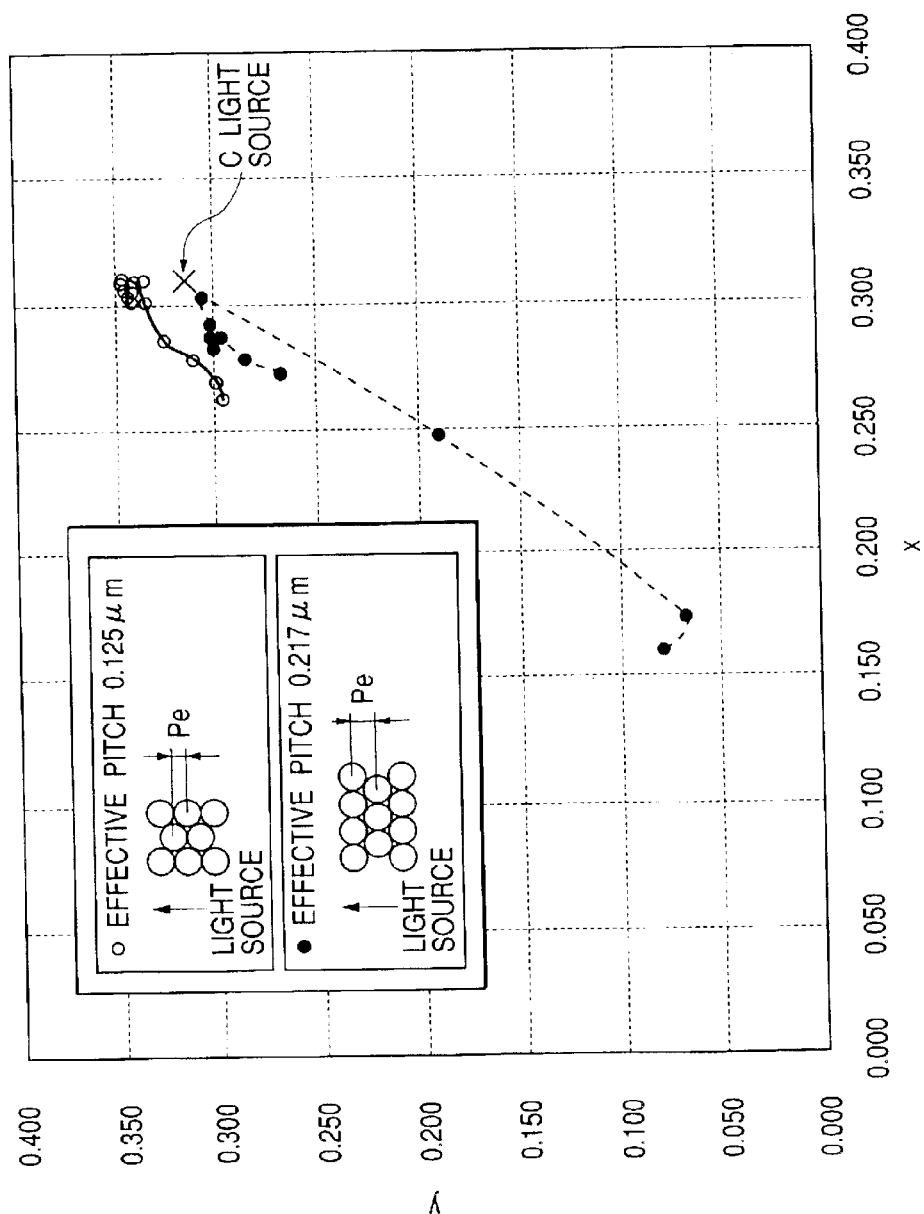
FIG. 9 is a graph showing a chromaticity of light leakage from a light guide plate according to a fourth embodiment.

Next, front lights comprising rod-shaped light sources were positioned on the side end faces of the two types of light guide plates. Chromaticity was measured with front light turned on as described above. As shown in the chromaticity diagram in FIG. 9, the chromaticity distribution of the light guide plate with an effective pitch of 0.125 μm of the anti-reflection layer was concentrated in the vicinity of the C light source compared to the light guide plate with an effective pitch of 0.217 μm of the anti-reflection layer. Moreover, the light guide plate having an effective pitch of 0.25 μm was less tinted and subjected to smaller changes in chromaticity when observed from diagonal direction. On the contrary, the chromaticity of the light guide plate having an effective pitch of 0.217 μm resides in the vicinity of the C light source when viewed from a front perspective and resulted in less tinting, but tinting became more significant when viewed from a diagonal perspective.

Figure 10:
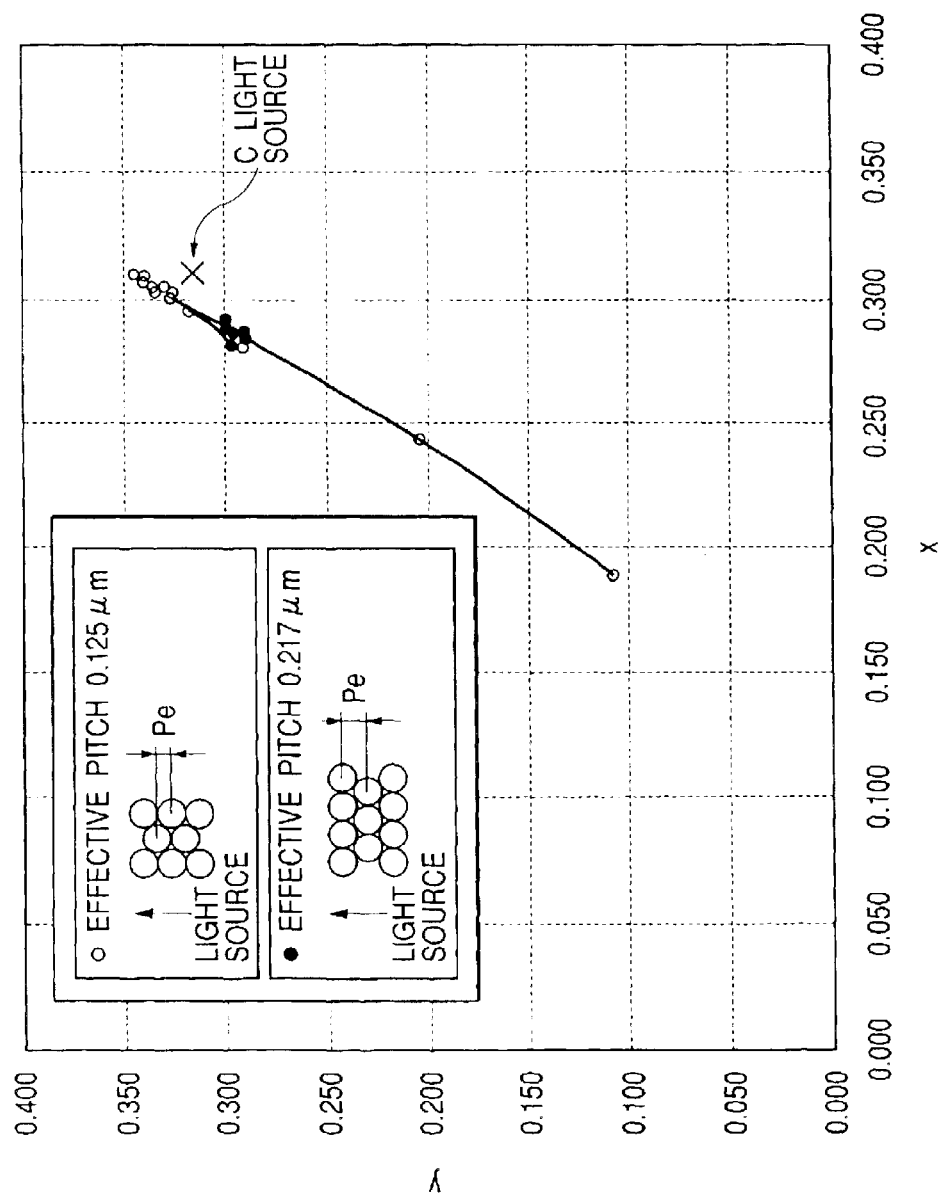
FIG. 10 is a second graph showing a chromaticity of light leakage from the light guide plate according to the fourth embodiment of the invention.

Next, the chromaticity of the two types of light guide plates were measured with the measuring angle varied in a direction orthogonal to the main light guide direction of the light guide plates. That is, the angle dependence of the light leakage in a direction in parallel with side end faces of the light guide plates was evaluated. The measuring angle was in the range from −30 degrees to 30 degrees. As shown in FIG. 10, the chromaticity distribution of the light guide plate with the minimum effective pitch in the main light guide direction of the light guide plate was greater than the light guide plate having an effective pitch of 0.217 μm in the direction in parallel with the side end face of the light guide plate. The difference occurs because the effective pitch of 0.217 μm results in a smaller pitch of the features orthogonal to the traveling light. When combined with a liquid crystal panel, there is a small chromaticity distribution in the vertical direction, and a chromaticity distribution in the horizontal direction is less likely to cause viewing problems. It is therefore preferable to use the light guide plate with the minimum effective pitch in an application in which the rod-shaped light source is provided at a top end and/or bottom end of the light guide plate.

Light leakage can be suppressed by making an effective pitch of the projections of a light guide plate smaller in the main light guide direction. From the results shown in FIG. 9 and FIG. 10, it is believed that the chromaticity can be substantially concentrated in the vicinity of a C light source when the effective pitch of an anti-reflection layer is about 0.15 μm or less. However, it is difficult to arrange and form projections like a tetragonal lattice with a pitch of 0.15 μm or less, and it is quite advantageous from a manufacturing and cost perspective to arrange projections in a staggered lattice.

To compare an anti-reflection layer having a multilayer film structure as described in the related art with an anti-reflection layer according to an embodiment of the invention, a known light guide plate was fabricated as a comparative sample. Specifically, a light guide plate having no concave or convex features formed on an exit surface was fabricated, and an anti-reflection layer made of $SiO_2$ layers and $TiO_2$ layers alternately and periodically stacked was formed on the exit surface of the light guide plate using a vacuum deposition method. Then, a light source was disposed on a side end face of the light guide plate to provide a front light.

Figure 11:
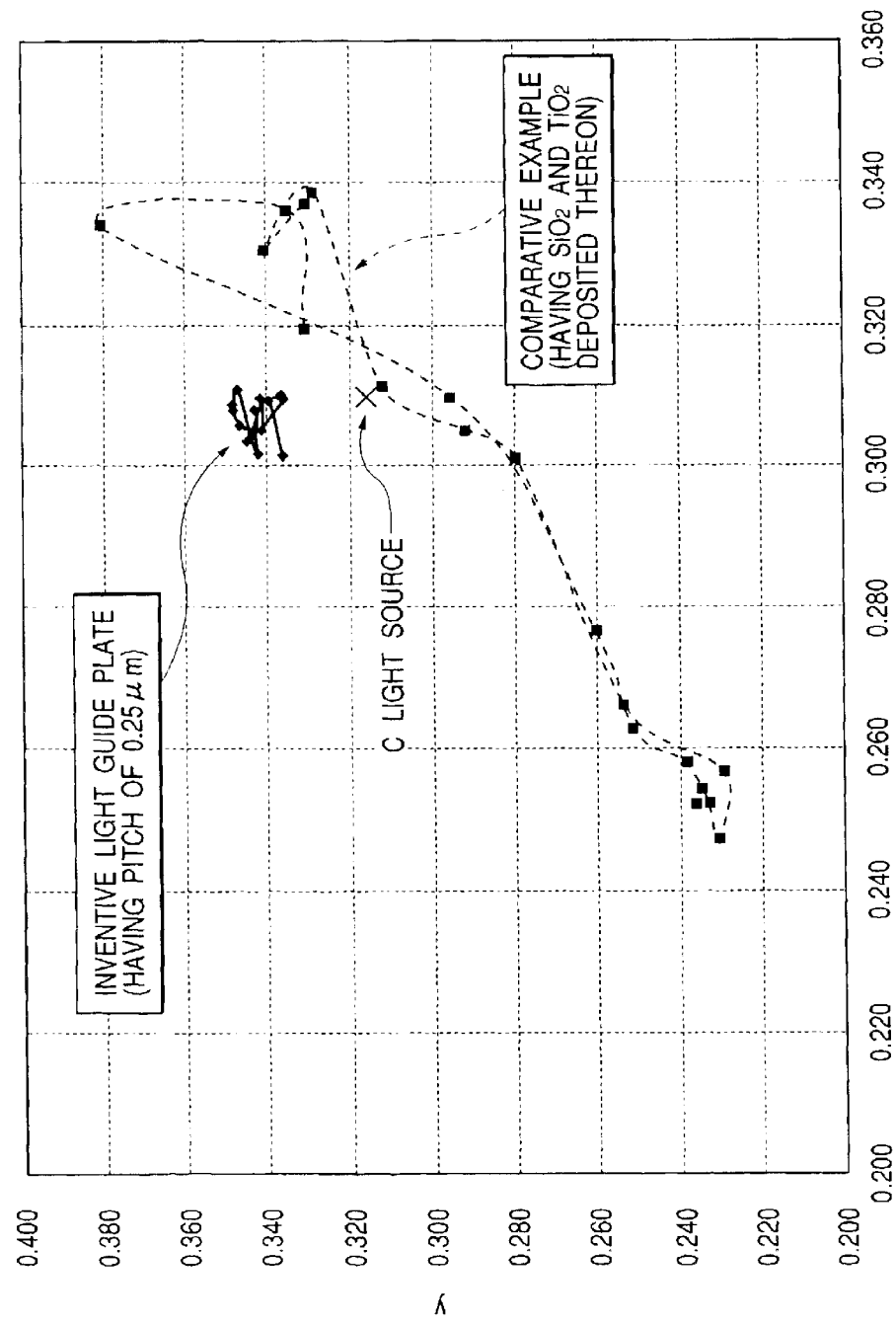
FIG. 11 is a graph showing a chromaticity of light leakage from a light guide plate according to a fifth embodiment and a related art comparative example.
Figure 12:
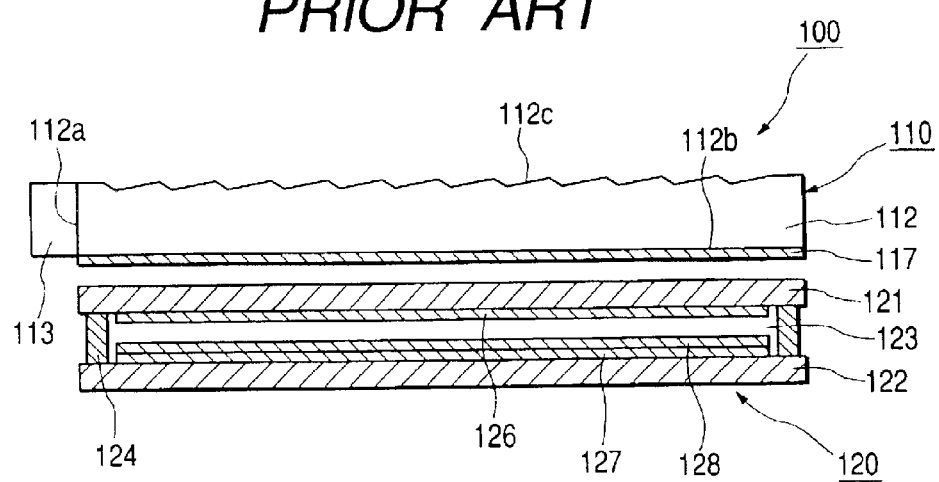
FIG. 12 is a sectional configuration diagram of a related art liquid crystal display.

Chromaticity was measured as previously described. For comparison purposes, FIG. 11 shows a result of measurement of chromaticity of the light guide plate whose anti-reflection layer that has a projection pitch of about 0.25 μm fabricated according to a second embodiment. As shown, the front light for comparison formed with an anti-reflection layer according to the related art has a large distribution of chromaticity, and a tinted leakage when viewed from varying angle, which indicates that the related art anti-reflection layers reduce color reproducibility in a diagonal direction significantly when combined with a liquid crystal panel. It was therefore shown that a liquid crystal display having a larger viewing angle than those in the related art can be made by combining the light guide plate embodiments with a liquid crystal panel.

As described, a light guide plate embodiment comprises a structure for receiving light from a light source at a side end face. Preferably, light propagating through the light guide plate exits at an exit surface. Since an anti-reflection layer having microscopic recesses and/or projections on a submicron order are arranged and/or formed in a lattice on an exit surface, the light propagating in the light guide plate can be efficiently conveyed from the exit surface. Preferably, this provides a highly efficient illumination device that can provide a high intensity.

When a light guide plate embodiment includes the microscopic recesses and/or projections formed in a staggered lattice, a higher density of recesses and/or projections can be used in comparison to a tetragonal arrangement. Preferably, the higher density achieves a small effective pitch which improves the anti-reflection effect and prevents tinting. When the direction of the recesses and/or projections of the light guide plate are formed in a staggered arrangement such that the effective pitch of the recesses or projections in a main light guide direction in the plane of the light guide plate is minimized, an improved anti-reflection effect is achieved.

A method of making a light guide plate comprises forming a light guide plate for receiving light from a light source positioned at a side end face. The method preferably utilizes a die having submicron microscopic recesses and/or projections formed like a lattice on a wall of a cavity. Preferably, the cavity wall is used to mold the exit surface of the light guide plate. Since an injection molding process can form an anti-reflection layer on the exit surface of the light guide plate as the light guide plate is molded, a light guide plate can be easily manufactured at a low cost with a high efficiency.

While some presently preferred embodiments of the invention have been described, it should be apparent that many more embodiments and implementations are possible and are within the scope of this invention. It is intended that the foregoing detailed description be regarded as illustrative rather than limiting, and that it be understood that it is the following claims, including all equivalents, that are intended to define the spirit and scope of this invention.

What is claimed is:

1. A light guide plate comprising:
   a light source;
   a light guide having a first side face and an exit surface, the first side face being coupled to the light source;
   an anti-reflection layer coupled to the exit surface, the anti-reflection layer comprised of submicron recesses or projections arranged in a lattice on the exit surface.

2. The light guide plate according to claim 1, wherein the microscopic recesses or projections have a pitch of about 0.3 μm or less.

3. The light guide plate according to claim 1, wherein the microscopic recesses or projections form a staggered lattice.

4. The light guide plate according to claim 3, wherein the arranging direction of the recesses or projections formed in a staggered arrangement is in a direction in which an effective pitch of the recesses or projections in a main light guide direction in a plane of the light guide plate is minimized.

5. The light guide plate according to claim 1, wherein the effective pitch of the recesses or projections in the main light guide direction in the plane of the light guide plate is about 0.15 µm or less.

6. The light guide plate according to claim 1, wherein the light source comprises a plurality of light sources coupled to opposite ends of the light guide.

7. A light guide plate according to claim 1, wherein the light source is positioned on a front side of a liquid crystal panel.

8. A method of manufacturing a light guide plate comprising a structure into which light from a light source is received at a side end face and from which a light propagated therein exits at an exit surface thereof through an injection molding process comprising:

forming microscopic recesses or projections on a submicron order in a cavity of a die;

injecting a molding material into the die to form a light guide plate having an exit surface with microscopic recesses or projections.

9. A method of manufacturing a light guide plate according to claim 8, wherein the act of forming microscopic recesses or projections comprises forming a staggered lattice of recesses or projections with a pitch of 0.3 µm or less on a cavity wall used to mold the exit surface of the light guide plate.

* * * * *